United States Patent [19]

Gelinas

[11] 3,743,043

[45] July 3, 1973

[54] TRANSMISSION AND STEERING SYSTEMS FOR VEHICLES PROVIDED WITH NON-STEERABLE WHEELS

[76] Inventor: Yvan Gelinas, 1860 Principale St., Lac Bellemare, Quebec, Canada

[22] Filed: May 27, 1971

[21] Appl. No.: 147,338

[52] U.S. Cl............. 180/6.2, 74/230.17 A, 74/722
[51] Int. Cl............................................. B62d 11/08
[58] Field of Search................... 180/6.2, 6.26, 6.32, 180/6.7, 5 R; 74/722, 230.17 A, 230.17 E, 230.17 M

[56] References Cited
UNITED STATES PATENTS

| 3,464,510 | 9/1969 | Washizawa et al. | 180/5 R |
|---|---|---|---|
| 2,556,512 | 6/1951 | Ammon | 74/230.17 E X |
| 2,529,489 | 11/1950 | Curtis | 180/6.2 X |
| 2,882,753 | 4/1959 | Pakosh | 180/6.2 X |
| 3,178,965 | 4/1965 | Mayfield et al. | 74/722 |
| 3,376,760 | 4/1968 | Gordanier | 74/722 X |
| 3,108,481 | 10/1963 | Westmont | 74/230.17 E X |

FOREIGN PATENTS OR APPLICATIONS

| 484,143 | 6/1952 | Canada | 180/6.26 |
|---|---|---|---|
| 940,347 | 10/1963 | Great Britain | 180/6.2 |
| 35,693 | 4/1954 | Poland | 180/6.2 |

Primary Examiner—Kenneth H. Betts
Assistant Examiner—Leslie J. Paperner
Attorney—Pierre Lesperance

[57] ABSTRACT

A transmission and steering system for vehicles having non-steerable wheels, for instance a two-track vehicle. The system comprises a steering member, such as a bicycle handle-bar, rotatably mounted in the vehicle and controlling in inverse manner a pair of variable diameter pulley transmission units, each connected to a non-steerable driving wheel or sprocket of the vehicle and each driven by the vehicle engine, whereby turning of the steering member progressively decreases the rotational speed of one driving wheel of the vehicle, while increasing the rotational speed of the other driving wheel, in order to obtain a smooth and progressive turning movement. The system is preferably connected to the engine through a centrifugally-operated variable diameter pulley and belt system, in order to automatically and progressively vary the transmission ratio between the engine and the vehicle driving wheels as a function of the engine speed. A manual device mounted on the steering member for adjustment by the driver, enables to vary the turning radius of the vehicle for a given angular position of the steering member.

2 Claims, 5 Drawing Figures

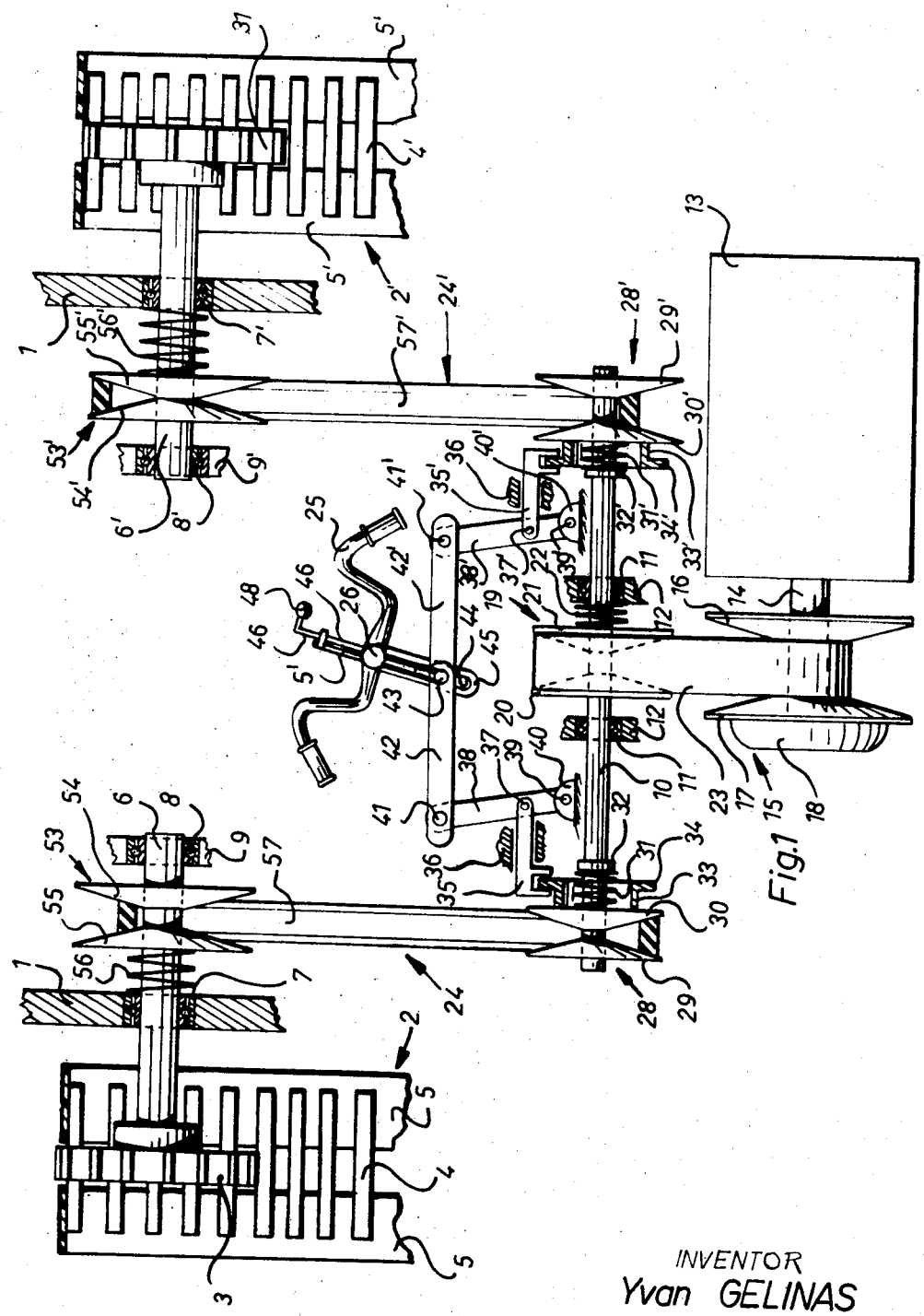

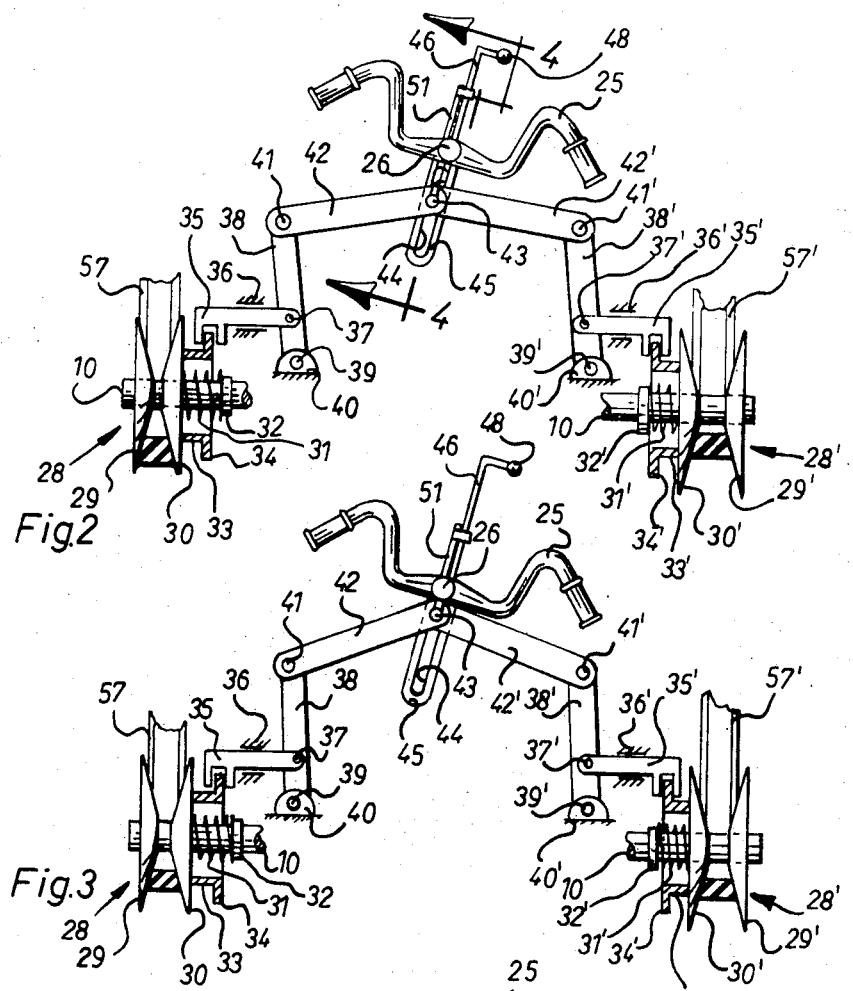
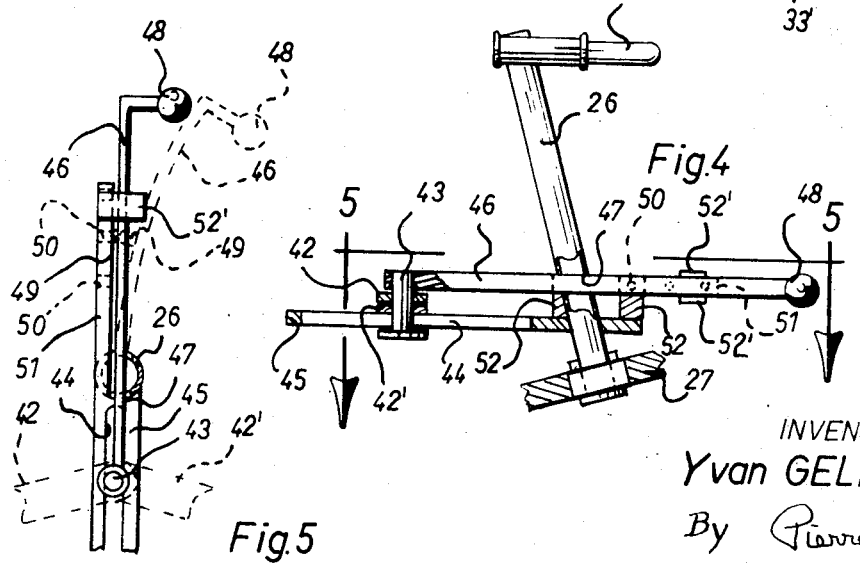
INVENTOR
Yvan GELINAS
By Pierre Lesperance
AGENT

TRANSMISSION AND STEERING SYSTEMS FOR VEHICLES PROVIDED WITH NON-STEERABLE WHEELS

The present invention relates to a combined transmission and steering system for vehicles having non-steerable wheels and, more particularly, to a two-track vehicle, the driving wheels of which always turn in the same plane and in which steering is obtained by differential rotation of the driving wheels on each side of the vehicle.

It is known to provide a transmission and steering system for a vehicle having non-steerable wheels, such as a two-track vehicle, including a single steering control member, such as a steering wheel or a steering handle-bar, to progressively decelerate the vehicle wheel on the inside of a turn and, simultaneously, progressively accelerate the driving wheel on the outside of the turn. However, in the known systems, for a given angular position of the steering control member, there always corresponds a predetermined turning radius of the vehicle. To suit various conditions in the use of the vehicle, it is highly desirable to provide means whereby the vehicle driver can vary the radius of turning movement of the vehicle for a given angular position of the steering control member.

The main object of the present invention resides in the provision of a system of the character described, comprising means to vary the radius of the turning movement of the vehicle for a given angular position of the steering control member.

Another object of the present invention resides in the provision of a system of the character described, providing means to adjustably vary the transmission ratio between the engine shaft and the driving wheel shafts.

Another object of the invention resides in the provision of a system of the character described, which is of simple and inexpensive construction, which is adapted more specifically for use in association with all terrain endless track vehicles of relatively small size and used principally for sport purposes.

The foregoing and other objects of the invention will become more apparent during the following disclosure and by referring to the drawings, in which:

FIG. 1 is a top plan view, partially in section, of the transmission and steering system of the invention used in a two-track vehicle;

FIGS. 2 and 3 are top plan views of a portion of FIG. 1 showing different adjusted positions of certain of its elements;

FIG. 4 is a vertical section taken along line 4—4 of FIG. 2; and

FIG. 5 is a view, partially in section, taken along line 5—5 of FIG. 4.

In the drawings, like reference characters indicate like elements throughout.

Referring to FIG. 1, the walls 1 are part of a vehicle chassis having two endless tracks 2,2'. In the drawings there are shown only the front portions of the tracks 2,2' which are driven by driving sprocket wheels 3 and 3' respectively. These sprocket wheels engage, for instance, cross bars 4,4' of endless tracks 2 and 2' and these cross bars interconnect two endless rubber bands 5,5' parallel to and spaced from each other.

The present invention is not concerned with the construction of the endless tracks 2 and 2' or of the sprocket wheels 3 and 3', as any other track system could be provided. Obviously, also, the vehicle could be fitted only with tire wheels or the like and without the sprocket wheels 3, 3' and the endless track 2, 2'. However, it is essential that the sprocket wheels 3, 3' or tire wheels be mounted on shafts 6, 6' which do not allow the tire wheels or sprockets 3, 3' to be steered. In the example shown, shafts 6, 6' extend through the respective walls 1 with the intermediary of a bearing 7, 7' and the ends of the shafts are mounted in bearings 8, 8' supported by parts 9, 9' of the vehicle chassis. The shafts 6, 6' are aligned and coaxial but independent from each other. An intermediate or third shaft 10 is rotatably mounted in the vehicle by means of bearings 11 supported by parts 12 of the vehicle chassis. This third shaft 10 is parallel to shafts 6,6' and can be mounted in any appropriate location.

The vehicle comprises an engine 13, such as an internal combustion engine, mounted on the vehicle chassis and having its output shaft 14 arranged parallel to intermediate shaft 10.

A centrifugally-operated variable diameter pulley 15, of known type, is mounted on output shaft 14. Pulley flange 16 of pulley 15 is secured to shaft 10 while pulley flange 17 is mounted for axial movement under action of centrifugal weights which rotate with output shaft 14 and which, with increase in the rotational speed, produce axial displacement of pulley flange 17 towards pulley flange 16. The centrifugal weights are mounted inside pulley cover 18.

A driven pulley 19, of variable effective diameter or pitch, is mounted on intermediate shaft 10 in alignment with driving pulley 15. Pulley flange 20 of driven pulley 19 is secured to shaft 10, while pulley flange 21 is axially movable on said shaft 10 and is urged towards pulley flange 20 under action of a compression coil spring 22 surrounding shaft 10 and abutting bearing 11 and movable pulley flange 21.

A V-belt 23 is trained on pulleys 15 and 19. This transmission system has a continuously variable transmission ratio between output shaft 14 of engine 13 and intermediate shaft 10 and comprises an automatic clutch: in the stopped position, pulley flanges 16 and 17 are sufficiently spaced apart to release V-belt 23. With increase in rotational speed of output shaft 14, the speed ratio between shaft 10 and shaft 14 progressively increases. This known system is widely used as a transmission for snowmobiles.

The invention further includes two variable diameter pulley systems, indicated at 24 and 24', interconnecting intermediate shaft 10 and shafts 6 and 6' respectively. Pulley systems 24 and 24' instead of being controlled by centrifugal force are controlled by a manual steering member 25 serving to steer the vehicle. As shown in the drawings, this steering member 25 preferably consists of a handle-bar such as used on bicycles or snowmobiles. It is secured to a steering shaft 26 rotatably mounted in a part 27 of the vehicle chassis, as shown in FIG. 4. Each variable diameter pulley system 24, 24' comprises a driving pulley 28, 28' respectively, the pulley flange 29,29' of which is secured to the intermediate shaft 10 while pulley flange 30,30' is axially displaceable on shaft 10 and urged towards the fixed pulley flange 29, 29' by a compression coil spring 31, 38' respectively surrounding the shaft 10 and bearing against the movable pulley flange 30, 30' and against a collar 32, 32' secured to shaft 10.

Movable pulley flanges 30, 30' are mounted in inverse position one with respect to the other and face each other. Each movable pulley flange 30, 30' is provided with a sleeve 33, 33' freely surrounding the coil spring 31, 31' and provided with a radial flange 34, 34'. A fork 35, 35' engages the radial flange 34, 34' and is mounted for movement in a direction parallel to shaft 10, each fork moving in a direction opposite to the other fork. The two forks 35 and 35' are guided in vehicle chassis parts 36 and are pivoted at 37, 37' respectively to the intermediate portion of a respective lever 38, 38', one end of which being pivoted at 39, 39' on a bracket 40, 40' secured to the vehicle chassis.

Each lever 38, 38' is pivoted at its other end at 41, 41' to link 42, 42' respectively. The other ends of the two links 42, 42' are pivotally interconnected by a pin 43 which is inserted into an elongated slot 44 of an arm 45 rigidly secured to the steering shaft 26. The longitudinal position of pin 43 in slot 44 can be changed and secured in adjusted position in order to vary the radial distance between said pin and the rotational axis of steering member 25.

In accordance with a preferred embodiment of this system, a control rod 46 is secured at one end to pin 43, extends through a transverse hole 47 of steering shaft 26 and is provided with a knob 48 at its free end and with a stud 49 intermediate its ends adapted to removably engage anyone of a series of holes 50 made in a bar 51 rigidly secured to arm 45 by means of blocks 52 (see FIG. 4). Bar 51 is provided at one end with ears 52', extending on both sides of control rod 46 for guiding the same when said control rod is pulled laterally by means of its knob 48 to disengage stud 49 from one of the holes 51.

Control rod 46 is flexible and resilient whereby, when released, it takes a straight position along bar 51 to maintain its stud 49 in the selected hole 50. Any other system could be used for manually adjusting and blocking pin 43 in a predetermined position along slot 44 of arm 45.

In the example known, the distance between holes 50 is selected in order to have three positions of links 42, 42', as shown in FIGS. 1, 2, and 3. In FIG. 1, links 42 and 42' are in alignment, whereas in FIGS. 2 and 3 the links form a progressively acute angle. Other positions could be provided in which the pin 43 would be located at the exterior of the position shown in FIG. 1 along arm 45 in order to inversely incline links 42, 42'. Driving variable diameter pulleys 28, 28' are respectively aligned with driven variable diameter pulleys 53, 53' mounted on shafts 6, 6' respectively.

Each driven pulley 53, 53' comprises a pulley flange 54, 54' secured to the shaft 6, 6' respectively and a movable pulley flange 55, 55' urged towards fixed pulley flange 54, 54' by a compression coil spring 56, 56' bearing against movable pulley flange 55, 55' and against bearing 7, 7'. The two driven pulleys 53, 53' are located inside the vehicle.

V-belts 57, 57' are trained on the respective driving pulleys 28, 28' and driven pulleys 53, 53'.

The system of the invention operates in the following manner:

Referring to FIG. 1, when the handle-bar 25 is turned in one direction or the other about its axis of rotation formed by steering shaft 26, arm 45 moves pin 43 along an arc of a circle in one direction or the other, causing pivoting of levers 38, 38' about their pivots 39, 39'.

When the handle bar 25 is pivoted in clockwise direction, as seen in FIG. 1, both levers 38, 38' pivot towards the left and move forks 35, 35' also to the left. Therefore, movable pulley flange 30' moves away from fixed pulley flange 29' of pulley 28. Thus, the effective diameter of pulley 28 is increased while the effective diameter of pulley 28' is decreased, as shown in FIG. 1. On the other hand, the effective diameter of pulley 53 is decreased while the effective diameter of pulley 53' is increased. In the first case, movable pulley flange 55 moves away from fixed pulley flange 54 against action of spring 56 due to the increased tension of V-belt 57. In the second case, the decrease in the tension of belt 57' allows coil spring 56' to move movable pulley flange 55' towards fixed pulley flange 54'. Therefore, the rotational speed of shaft 6' with respect to intermediate shaft 10 is decreased, while the rotational speed of shaft 6 with respect to intermediate shaft 10 is increased. A right turn is obtained, that is in the same direction as the direction of rotation of handle-bar 25. When the handle-bar is in a straight position, the transmission ratio between intermediate shaft 10 and both shafts 6, 6' is equal and, therefore, the vehicle moves in a straight line. When the handle bar is turned counterclockwise, the vehicle will make a left-hand turn.

The pulley systems 24 and 24' can be arranged in such a manner that the maximum spacing of the pulley flanges of the driving pulleys 28, 28' results in declutching of belts 57, 57', in order that the sprocket wheel 3 or 3' on the inside of the turn becomes completely stationary. In association with declutching of the belt 57, 57', there may be provided an automatic braking system on shafts 6'6 automatically braking the shaft on the inside of the turn to maintain the same stationary. Because the transmission ratio between intermediate shaft 10 and shafts 6, 6' is progressively and continuously variable, one obtains a progressive turning movement without jerks. The turning movement of the vehicle can be effected within a very short radius, because the sprocket wheel 3 or 3' on the outside of the turn rotates at a greater speed than that of intermediate shaft 10. Therefore, in practice, it is not necessary to completely stop shaft 6 or 6' on the inside of the turn, and because shafts 6 or 6' are constantly drivingly connected with intermediate shaft, it is not necessary to provide a brake for these shafts.

The manual brake for the vehicle can be mounted on shaft 10 in order to be common to the two shafts 6, 6'. This manual brake is to be applied to shaft 10 when driving engine pulley 15 is in declutched position. The variable diameter pulley system 15, 19, which is centrifugally operated, in combination with the steering and transmission system previously described, forms a completely automatic transmission system between the engine and the tracks, the transmission ratio of which progressively decreases with increase in the engine rotational speed.

Supposing handle bar 25 to be in straight position and that stud 43 is adjustably displaced along slot 44 of arm 45 by means of control rod 46, one obtains an angular relationship between links 42 and 42', as shown in FIGS. 2 or 3. This causes movements of forks 35 and 35' one towards the other and, thus, simultaneously and equally decreases the effective diameters of pulleys 28, 28'. Thus, one obtains a decrease in the rotational speeds of shafts 6, 6' with respect to intermediate shaft 10 for the same angular steering position of steering member 25 and, therefore, an increase in the torque output of shafts 6, 6' is produced. At the same time, because stud 43 is closer to steering shaft 26, levers 38, 38' pivot to a smaller extent for the same angular rotation of handle bar 25 and a smaller difference in the effective diameters of the two pulleys 28, 28' and thus a greater turning radius are obtained for the same rotated angle of handle 25. However, one can adjust links 42, 42' to inversely incline the same one with respect to the other relative to the position as shown in FIGS. 2 and 3 and, in this case, one obtains the previously mentioned increase in output torque for shafts 6, 6', while decreasing the vehicle turning radius for an equal rotation of handle bar 25. The system enables to obtain the desired torque on the outside shaft of the turn under all driving conditions.

It is obvious that the steering and transmission system in accordance with the invention can be used not only in association with two-track vehicles but also with four-wheel or six-wheel vehicles, in which all the wheels are non-steerable. The system can be equally applied to a four-wheel or a six-wheel vehicle in which all the wheels are power driven.

What I claim is:

1. A transmission and steering system for all terrain vehicles of the type comprising an engine and at least four unsteerable wheels, at least two of said wheels being driving wheels, said system comprising, in combination, two axially aligned shafts, each connected to one of said driving wheels, and a third shaft parallel to said aligned shafts, a driving connection between said third shaft and the shaft of said engine, a pair of first variable diameter pulleys mounted on said third shaft, a second variable diameter pulley mounted on each of said aligned shafts in alignment with one of said first pulleys, transmission belts trained on said first and second pulleys, said pulleys each having a fixed pulley flange and an axially movable pulley flange, a vehicle steering mechanism comprising a manual steering member movably rotatably mounted in said vehicle and means linking said manual steering member to the axially movable pulley flanges of said first pulleys to simultaneously change the axial positions of said pulley flanges of said first pulleys, in order to increase the effective diameter of one of said first pulleys while decrease the effective diameter of the other of said first pulleys to progressively vary the relative rotational speed of said two aligned shafts and produce turning movement of the vehicle, and wherein the axially movable pulley flanges of said first pulleys are in inverted position one with respect to the other on said third shaft, each of said axially movable pulley flanges of said first pulleys having an annular portion, said linking means comprising two forks each engaging one of said annular portion and movably mounted axially of said third shaft, a radial arm secured to said manual steering member and lever means interconnecting said radial arm and said forks to displace the latter in the same direction under rotation of said manual steering member, said lever means including, for each fork, a lever pivoted on said vehicle and to said fork and a link pivotally connected at one end to said lever, a common piece to which the other ends of said two links are pivotally connected, said common piece being carried by said radial arm in an excentric position with respect to the axis of rotation of said manual steering member, and manual control means on said steering member to vary the excentric position of said common piece on said radial arm and lock said common piece in a predetermined excentric position.

2. A transmission and steering system as claimed in claim 1, wherein said common piece is a pin, said radial arm being provided with an elongated slot radially extending with respect to the axis of rotation of said manual steering member, said pin displaceable in said slot, said manual control means comprising a flexible rod secured to said pin and guided for movement along said radial arm, the latter having radially spaced holes and a stud secured to said flexible rod and engageable with anyone of said holes.

* * * * *